No. 753,370. PATENTED MAR. 1, 1904.
G. F. CRIPPEN.
BEAN PICKING MACHINE.
APPLICATION FILED FEB. 27, 1903.
NO MODEL. 3 SHEETS—SHEET 1.
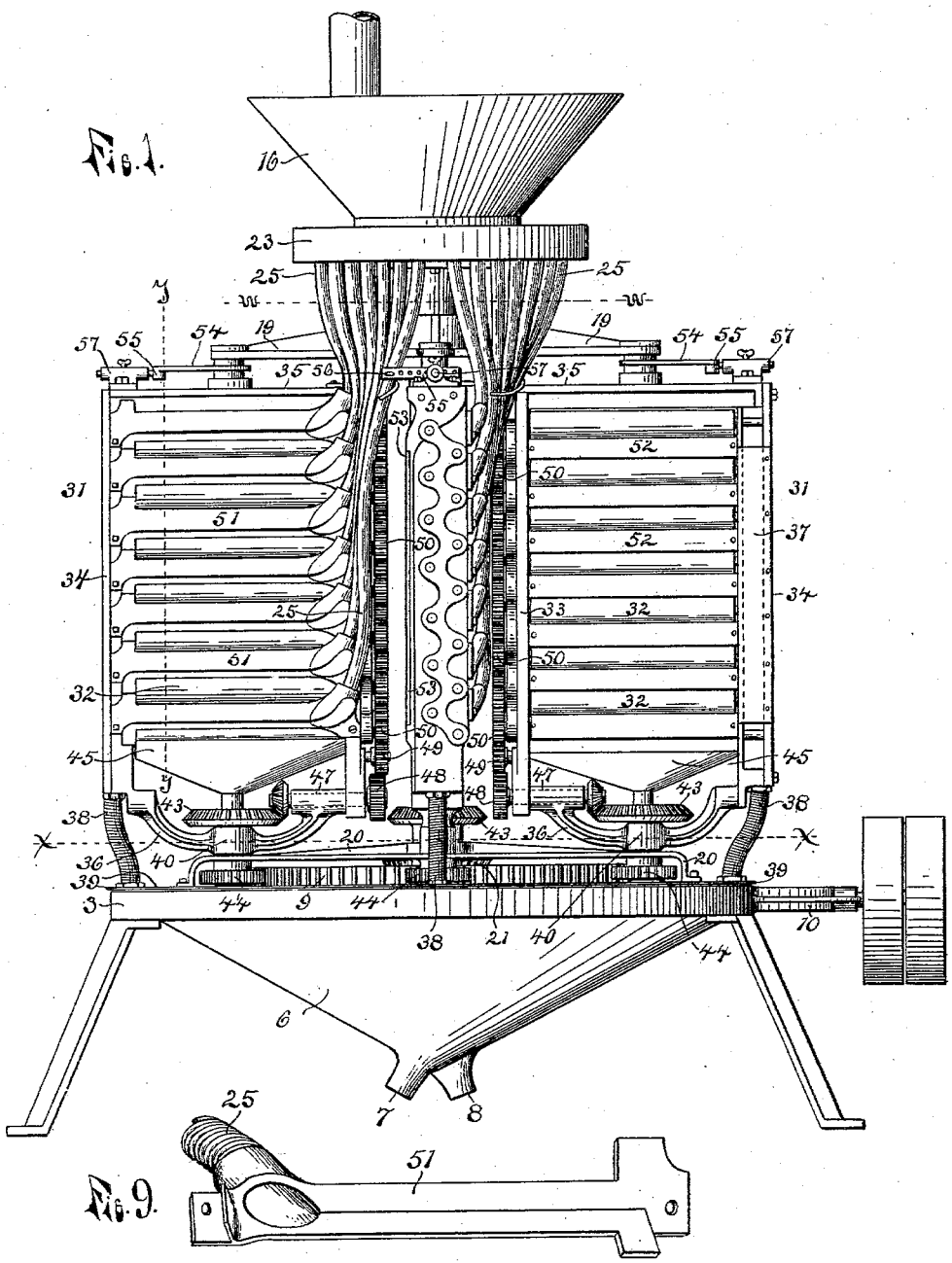
WITNESSES. INVENTOR.
George F. Crippen,
Attorneys.

No. 753,370. PATENTED MAR. 1, 1904.
G. F. CRIPPEN.
BEAN PICKING MACHINE.
APPLICATION FILED FEB. 27, 1903.
NO MODEL. 3 SHEETS—SHEET 2.
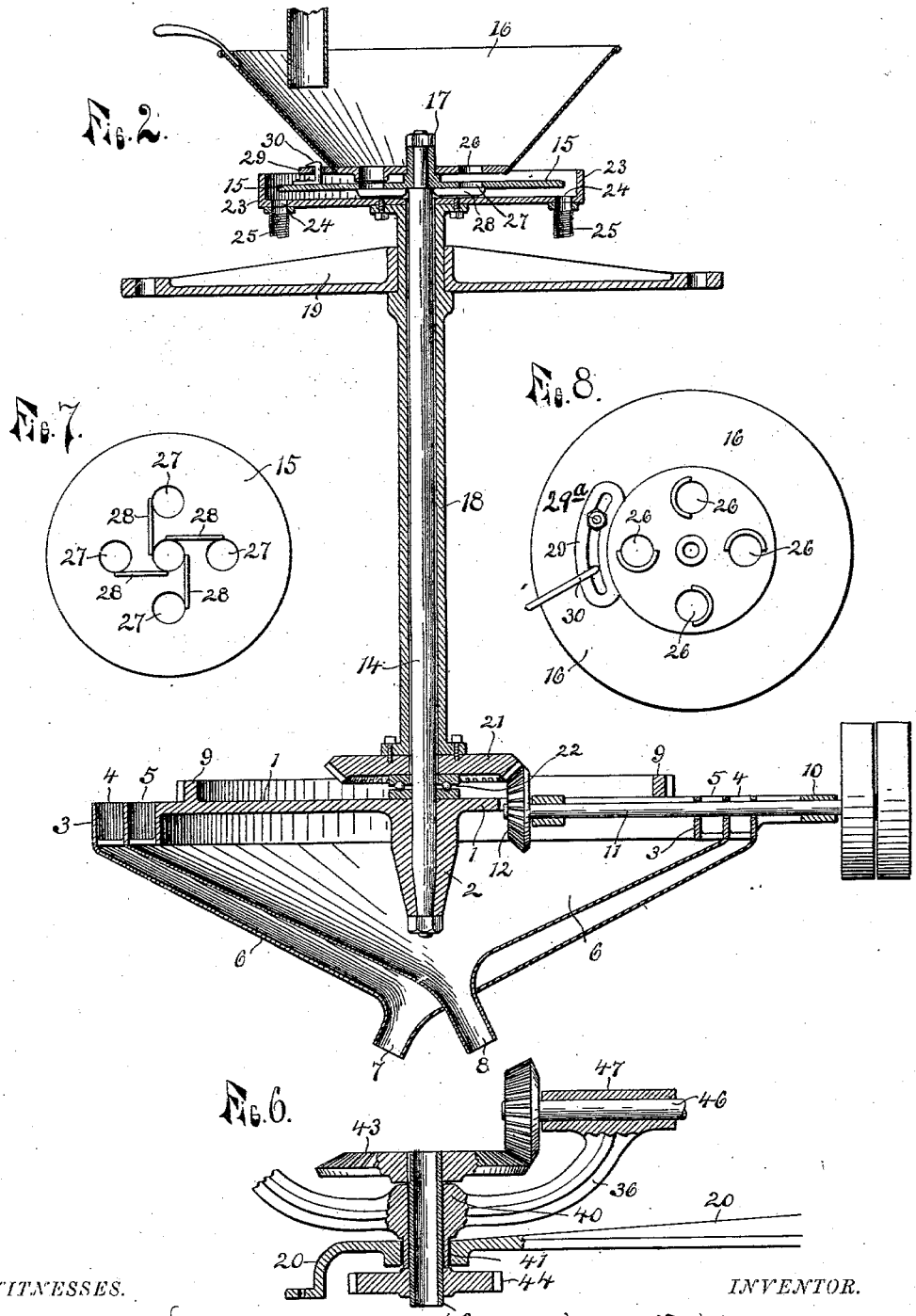
WITNESSES. INVENTOR.
Attorneys.

No. 753,370. PATENTED MAR. 1, 1904.
G. F. CRIPPEN.
BEAN PICKING MACHINE.
APPLICATION FILED FEB. 27, 1903.
NO MODEL. 3 SHEETS—SHEET 3.
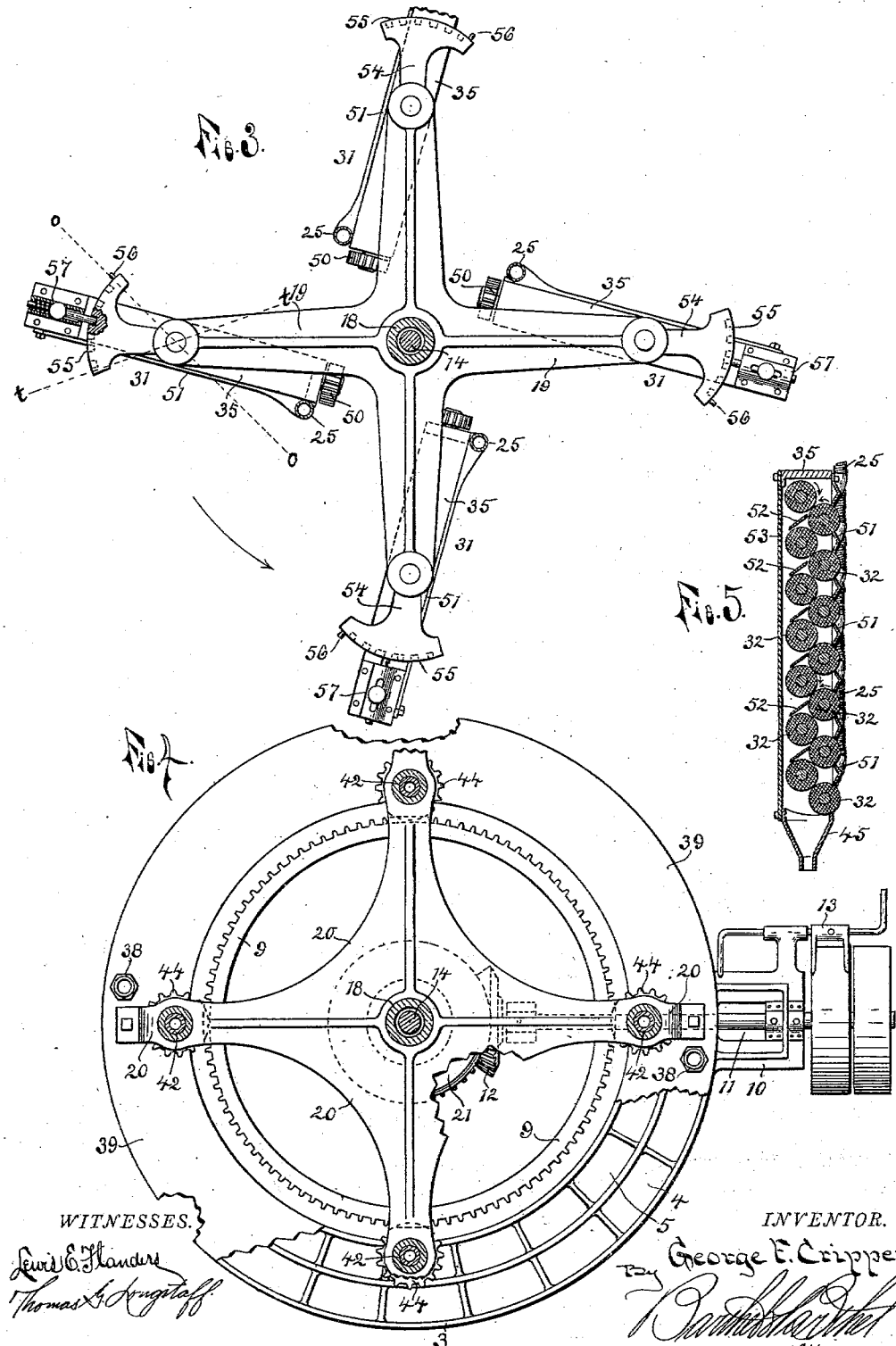
WITNESSES.
INVENTOR.
George F. Crippen
Attorneys.

No. 753,370.

Patented March 1, 1904.

UNITED STATES PATENT OFFICE.

GEORGE F. CRIPPEN, OF YPSILANTI, MICHIGAN.

BEAN-PICKING MACHINE.

SPECIFICATION forming part of Letters Patent No. 753,370, dated March 1, 1904.

Application filed February 27, 1903. Serial No. 145,346. (No model.)

*To all whom it may concern:*

Be it known that I, GEORGE F. CRIPPEN, a citizen of the United States of America, residing at Ypsilanti, in the county of Washtenaw and State of Michigan, have invented certain new and useful Improvements in Bean-Picking Machines, of which the following is a specification, reference being had therein to the accompanying drawings.

This invention relates to new and useful improvements in bean-picking machines, and has for its object to make a rotary machine in which the centrifugal force will be utilized to feed the beans across the separating-rolls, said rolls being journaled in swing-frames adapted to be turned at an angle to the path of rotation, which angle determines the speed at which the beans will be fed across the rolls, the good beans being discharged at the opposite end of the rolls, while the poor beans are drawn through between the rolls.

Up to the present time no bean-picking machine has been devised in which the centrifugal force has been utilized to feed the beans across the rolls; and it is one of the objects of my invention to make a rotary bean-picking machine which will utilize this force, and in this resides the generic feature of my invention.

To this end the invention consists of a revoluble member provided with radial arms carrying swing-frames in which are journaled the separating or discriminating rolls and in the means for driving the same.

The invention further consists in the peculiar construction of the feed and discharge hoppers, the means for changing the angle of the swing-frames, and in the peculiar construction, arrangement, and combination of parts, all as more fully hereinafter described, and shown in the accompanying drawings, in which—

Figure 1 is a side elevation of my improved bean-picking machine; Fig. 2, a vertical central section with the swing-frames removed; Fig. 3, a plan view, partly in section, on the line $w\ w$, Fig. 1; Fig. 4, a section on the line $x\ x$, Fig. 1; Fig. 5, a section through one of the swing-frames on the line $y\ y$, Fig. 1; Fig. 6, a section through one of the brackets supporting the swing-frames, showing the tubular discharge-shaft; Fig. 7, a bottom plan view of the spreader-disk; Fig. 8, a bottom plan view of the feed-hopper; Fig. 9, a perspective view looking at the inside of one of the covering-plates for the rolls forming the feed-troughs.

As shown in the drawings, 1 is the base, provided with the central depending boss 2, having a taper bore and the annular rim 3, provided with the discharge-passages 4 5 for the good beans and culls, respectively, to the under side of which rim is secured the double discharge-hopper 6, communicating with the respective passages and provided with discharge-spouts 7 and 8.

9 is a fixed ring-gear, preferably formed integral with the base, and 10 a bracket formed integral with the rim 3. 11 is a shaft journaled in bearings on said base and bracket, respectively, and provided with a bevel-pinion 12 on its inner end and a tight and loose pulley on its outer end.

13 is a belt-shifter journaled in a bearing forming an extension of the bracket 10.

14 is an upright standard fixedly held in the boss 2 by a nut and carrying at its upper end the stationary spreader-disk 15 and loose feed-hopper 16, mounted on a reduced portion of said standard and held in place by a nut 17. 18 is a tubular shaft sleeved on said standard and provided with radial arms 19 and 20, secured to the upper and lower ends of said shaft, respectively. 21 is a bevel-gear carried by the lower end of said shaft, meshing with the pinion 12, and 22 is a ball-bearing interposed between the lower end of said shaft and supporting-base, so that said tubular shaft and radial arms are free to revolve through the medium of said gearing while the feed-hopper remains stationary, all as shown in Fig. 2.

23 is a circular pan carried by the upper end of the shaft 18 and provided with apertures 24 near its outer edge, to which the flexible-wire feed-tubes 25 are connected, said tubes being preferably made in the form of a closely-wound coil-spring.

26 represents the discharge-openings in the bottom of the feed-hopper 16, each of said openings being provided with a semicircular depending lip around the rear half of each opening, as shown in Fig. 8.

27 represents openings in the spreader-disk 15 adapted to register with the opening 25 in the hopper, each opening being provided with a depending radial rib 28 in advance of the opening (see Fig. 7) adapted to spread the beans out toward the periphery of the disk and feed the same down the openings 24 and tubes 25 to the separating-rolls. By reason of these depending lips and ribs I am enabled to keep the openings 26 and 27 unobstructed, thereby permitting a steady flow of the beans, the ribs 28 at the same time acting to spread or feed the beans toward the periphery of the disk.

29 is a slotted plate carried by the feed-hopper and provided with graduations and an adjustable stop $29^a$, and 30 is a fixed stop or finger carried by the spreader-disk 15, so that by turning the hopper to cause the holes 26 to register more or less with the holes 27 any desired feed may be obtained.

Pivotally mounted in the outer ends of the radial arms 19 and 20 are the swing-frames 31, in which the separating or discriminating rolls 32 are journaled, preferably fourteen in number, each pair coöperating to make a perfect unit independent of the others and provided with its own source of supply. Each swing-frame comprises the vertical uprights 33 and 34, in which the rolls are journaled, united at their upper and lower ends, respectively, by the connecting-bar 35 and bracket 36.

37 is a right-angled plate secured to the upright 34 and forming a discharge-passage for the good beans from the rolls, said discharge-passage being connected with the passage 4 by means of a flexible-wire tube 38 and projecting through the circular sheet-metal cover 39 for the annular passages 4 and 5, carried by the outer ends of the arms 20.

40 is a tubular hub on the bracket 36, formed with a reduced portion 41 fitting in a bearing-aperture in the outer end of the arm 20, forming the lower pivot-bearing for the swing-frame, and 42 is a tubular shaft extending through said hub, arm, and cover 39 into the passage 5 and carrying a bevel-gear 43 at its upper end and a pinion 44 at its lower end meshing with the fixed ring-gear 9 on the base, (see Figs. 1, 4, and 6,) and 45 is a hopper secured between the uprights 33 34 below the feed-rolls and provided with a discharge-tube fitting in the tubular shaft 42, so that as the cull-beans fall from the rolls into the hopper they will be conducted through the tubular shaft 42 into the discharge-passage 5 and hopper 6.

46 is a transverse shaft mounted in a horizontal bearing 47 in the bracket 36 and carrying a bevel-pinion at one end meshing with the gear 43 and a straight gear 48 at its opposite end meshing with an idler 49, mounted on a stub-shaft, which in turn meshes with the lowermost of the gears 50, mounted on the inner ends of the shafts of the feed-rolls, each roll driving the next adjacent roll, so that each pair of rolls will turn in the same direction to draw the poor beans between the rolls by reason of their roughened surface being taken hold of by the rolls, which are covered with a yielding material, preferably rubber. It will thus be seen that as the machine revolves the separating-rolls will be driven through the medium of the gearing just described by reason of the pinion 44 rolling on the fixed ring-gear 9, the speed of the machine determining the speed of the rolls in proportion thereto.

The separating-rolls are journaled in pairs in the frame, each pair provided with its own feed-tube 25, connected to the inner tubular end of the V-shaped plates 51, forming feed-troughs for conducting the good beans across the rolls into the vertical discharge-passage at the opposite end of the rolls, the inner tubular end of the plates being so shaped as to shoot the beans across the rolls, so as to allow the full width of the rolls to work at a time, thereby insuring a large capacity for the machine.

52 represents inclined shields or guard-plates secured in rear of each set of rolls to prevent the dirt and poor beans as they are discharged from the rolls from being drawn in again by the rolls below by reason of the beans striking the back plate or cover 53 when discharged and being deflected back against the rolls, said back plate being shown removed on the right-hand side of Fig. 1 to show the plates 52 and interior construction.

54 represents arms forming extensions of the arms 19 and carrying apertured segments 55 at their outer ends provided with a stop-pin 56, and 57 represents spring-bolts carried by the swing-frames coöperating with said apertured segments to hold said frames at any desired angle to the path of rotation, the frames being shown at substantially right angles in Fig. 1 and at substantially fifteen degrees back of right angles in Fig. 3, which is about the proper angle for running ordinary stock, and I find that a range of adjustment varying from fifteen degrees ahead of right angles to forty-five degrees back thereof, as indicated by the dotted lines in Fig. 3, is sufficient for all ordinary uses to which such a machine might be put, the theory on which my invention works being that the dirt, grit, or poor beans being rough will be drawn through the rolls, while the good beans being smooth will not be taken hold of by the rolls, but will be fed across the rolls by the aid of the centrifugal force and discharged at the opposite end, the theory of the angular adjustment being that the greater the angle $o\ o$ the faster the beans will be fed across the rolls and the less dirt and culls will be picked out, while the greater the angle $t\ t$ with the arms 19 the slower the beans will be fed across and the more culls will be picked out, varying, of course, within certain limits, according to the velocity of the machine, the separating or discriminating rolls operating upon the friction principle, and as the angle of the rolls is changed the friction will be cut out more or less.

Having thus fully described the invention, it is intended to operate as follows: Power being applied to the shaft 11, motion will be imparted to the shaft 18, carrying the swing-frames 31 and pan 23, through the medium of the gears 12 21, and as the parts slowly revolve motion will be imparted to the separating-rolls through the mechanism already described, and as the beans are fed from the feed-hopper through the spreader-disk and spread upon the pan they will be feed down the tubes 25 across the feed-rolls, the dirt, stones, and poor beans being drawn between the rolls and discharged into the hopper 45, passage 5, and inner hopper 6, from whence they are discharged through the spout 8, while the good beans, which are hard and smooth, will be carried across the rolls and discharged into the vertical discharge-passage, tube 38, passage 4, and outer hopper 6, from whence they are discharged through the spout 7. I have found in the actual operation of my machine that it will pick beans equal to the best hand-picked and at a rate of speed far in advance of anything heretofore attempted.

While I have described my invention as a bean-picking machine, I wish it understood that it may be used for picking peas, grain, &c.

Having thus fully described my invention, what I claim is—

1. A centrifugal bean-picking machine having a passage formed by pairs of rolls with which the beans are adapted to travel in contact in passing therethrough, the rolls of said pairs being in different horizontal planes, and means for bodily rotating said roll approximately in the planes cut by their horizontal axes and by which the beans are fed by centrifugal force.

2. A centrifugal bean-picking machine having a passage one side of which is formed by a pair of rolls, and means to so rotate the rolls that the beans will be fed through the passage lengthwise of the rolls.

3. A centrifugal bean-picking machine having passages one or more sides of which are formed by a pair of rolls and means to so rotate the rolls as to feed the beans through said passages by centrifugal force in contact with the rolls, said rolls being disposed in different horizontal planes.

4. A centrifugal bean-picking machine having a passage one side of which is formed of a pair of rolls and means for rotation of the rolls bodily in such planes that there will be a tendency of the material fed to the passage to travel lengthwise thereof.

5. A centrifugal bean-picking machine having a passage formed by two revolving rolls, means to so rotate the rolls that the beans will be fed lengthwise of the passage, an inlet-opening at one end of the rolls and a discharge-passage at the other end of the rolls and a separate discharge-passage communicating with the space between the rolls.

6. A centrifugal bean-picking machine having a series of passages formed by pairs of rolls, and means to so rotate the said rolls that the beans will be fed lengthwise of the passage.

7. A centrifugal bean-picking machine, provided with a series of passages, means for bodily rotating the separating-rolls approximately in the planes cut by their longitudinal axes and by which the beans are fed by centrifugal force, one side of said passages being formed by a pair of revolving rolls along which the beans are adapted to travel, and a discharge-passage communicating with said bean-passages beyond the ends of the rolls.

8. A centrifugal bean-picking machine, provided with a series of passages, means for bodily rotating the separating-rolls approximately in the planes cut by their longitudinal axes and by which the beans are fed by centrifugal force, one side of said passages being formed by a pair of revolving rolls with their axes in the different horizontal planes along which the beans are adapted to travel, and a discharge-passage communicating with the passages beyond the ends of the rolls and a separate discharge-passage communicating with the space between the rolls.

9. A centrifugal bean-picking machine provided with a series of passages, means for bodily rotating the separating-rolls approximately in the planes cut by their longitudinal axes and by which the beans are fed by centrifugal force, one side of said passages being formed by a pair of revolving rolls along which the beans are adapted to travel, and separate discharge-passages one for the good and one for the bad beans one arranged within the other and each one leading to a receptacle for receiving the beans.

10. A centrifugal bean-picking machine provided with a series of passages, means for bodily rotating the separating-rolls approximately in the planes cut by their longitudinal axes and by which the beans are fed by centrifugal force, one side of said passages being formed by a pair of revolving rolls along which the beans are adapted to travel, and a discharge-passage communicating with the bean-passage beyond the ends of the rolls, and a separate discharge-passage communicating with the space between the rolls, each one of said discharge-passages leading to a separate receptacle for receiving the beans, the axes of said rolls being in different horizontal planes.

11. A centrifugal bean-picking machine, provided with a series of passages, means for bodily rotating the separating-rolls approximately in the planes cut by their longitudinal axes and by which the beans are fed by centrifugal force, one wall of said passages being formed by a pair of revolving rolls along which the beans are fed in contact therewith, said rolls being arranged in different horizontal planes and a feed-hopper communicating with said passages.

12. A centrifugal bean-picking machine, provided with a series of passages, means for bodily rotating the separating-rolls approximately in the planes cut by their longitudinal axes and by which the beans are fed by centrifugal force, one side of said passages being formed by revolving rolls, a hopper communicating with the passages at the inner ends of the rolls and a discharge-passage communicating with said passages beyond or at the outer end of the rolls.

13. A centrifugal bean-picking machine provided with a series of passages, means for bodily rotating the separating-rolls approximately in the planes cut by their longitudinal axes and by which the beans are fed by centrifugal force, one side of said passages being formed by revolving rolls, a hopper communicating with the passages at one end of the rolls and a discharge-passage at the other end and a separate discharge-passage communicating with the space between the rolls.

14. In a centrifugal bean-picking machine, a revolving rack formed with a series of passages, means for bodily rotating the separating-rolls approximately in the planes cut by their longitudinal axes and by which the beans are carried by centrifugal force, the inner ends of said passages provided with means for feeding beans thereto, the outer ends leading into a common discharge-passage and a pair of revolving rolls forming the side of the passage with which the beans travel in contact in passing therethrough.

15. In a centrifugal bean-picking machine, a revolving rack formed with a series of passages through which the beans are carried by centrifugal force, said passages provided at one end with means for feeding the beans thereto and at the opposite end with a common discharge-passage, a pair of revolving rolls forming the side of the passage with which the beans travel in contact and a separate discharge-passage communicating with the space between the rolls.

16. A centrifugal bean-picking machine, having radial passages one or more sides of which are formed by a pair of rolls and means for bodily rotating the separating-rolls approximately in the planes cut by their longitudinal axes and by which the beans are adapted to be fed by centrifugal force in contact therewith and means for making the contact variable.

17. A centrifugal bean-picking machine, a revoluble rack, frames adjustably mounted in said rack having radial passages one side of which are formed by a pair of rolls across which the beans are adapted to be fed by centrifugal force in contact therewith.

18. In a centrifugal bean-picking machine, a revoluble rack, frames pivotally mounted in said rack, having radial passages one side of which are formed by a pair of rolls arranged in different horizontal planes and through which the beans are fed by centrifugal force, said passages leading from the inner to the outer circumference of the frames and means for adjusting the angularity of said frames.

19. In a centrifugal bean-picking machine, a revoluble rack, frames pivotally mounted in said rack having radial passages one side of which is formed by a pair of rolls across which the beans are adapted to be fed by centrifugal force and means for maintaining said passages at an angle to the radial line to vary the contact of the beans with the rolls.

20. In a centrifugal bean-picking machine, a revoluble rack, frames pivotally mounted in said rack formed with a series of passages through which the beans are carried by centrifugal force, said passages provided at one end with means for feeding the beans thereto and at the opposite end with a discharge-passage and a pair of revolving rolls forming one wall of the passage with which the beans are adapted to travel in contact.

21. In a centrifugal bean-picking machine, a revoluble rack; frames pivotally mounted in said rack formed with a series of passages through which the beans are carried by centrifugal force, the inner ends of said passages provided with means for feeding beans thereto, the outer ends leading into a common discharge-passage and a pair of revolving rolls forming the side of the passage with which the beans are adapted to travel in contact, and a separate discharge-passage communicating with the space between the rolls.

22. In a centrifugal bean-picking machine, a revoluble rack, frames carried by said rack formed with a series of passages through which the beans are carried by centrifugal force, a feed-hopper, tubes connecting said feed-hopper with the inner ends of said passages, a common discharge-passage connecting the outer ends of said passages, a pair of revolving rolls forming the side of the passage with which the beans are adapted to travel in contact, and mechanism for revolving said rolls and rack.

23. In a centrifugal bean-picking machine, a revoluble rack, frames pivotally mounted in said rack, formed with a series of passages through which the beans are fed by centrifugal force, the inner ends of said passages provided with means for feeding beans thereto, the outer ends leading into a common discharge-passage, a pair of revolving rolls forming part of the passage with which the beans are adapted to travel in contact and means for holding the frames in any of their adjusted positions to vary the contact of the beans with the rolls.

24. In a centrifugal bean-picking machine, a revoluble rack, frames pivotally mounted in said rack, having radial passages, one side of which are formed by a pair of rolls and through which the beans are fed by centrifugal force, said passages being adjustable at an angle to the radial line and means for maintaining the same at said angle.

25. In a centrifugal bean-picking machine, a revoluble rack, frames pivotally mounted in said rack, having passages, one side of which are formed by a pair of rolls and through which the beans are adapted to be fed, a feed-hopper, separate feed-tubes connecting the inner ends of said passages with the hopper, a common discharge-passage connecting the opposite ends of said passages with a common discharge-hopper, a separate discharge-passage connecting the spaces between the rolls with a separate hopper and means for adjusting the angularity of said frames.

26. In a centrifugal bean-picking machine, the combination of a plurality of rolls, swinging frames, and means for imparting motion to said separating-rolls, and bodily rotate them approximately in the planes cut by their horizontal axes.

27. In a centrifugal bean-picking machine, the combination of a plurality of rolls, swinging frames, means for imparting motion to said separating-rolls and bodily rotate them approximately in the planes cut by their horizontal axes, and a feed-tube through which the beans are fed to said rolls.

28. In a centrifugal bean-picking machine, the combination of a plurality of rolls, swinging frames, means for imparting motion to said separating-rolls, a feed-tube through which the beans are fed to said rolls, and a rotatable pan to which said tubes are connected.

29. In a centrifugal bean-picking machine, the combination of a plurality of rolls, swinging frames, means for imparting motion to said separating-rolls, a feed-tube through which the beans are fed to said rolls, a rotatable pan to which said tubes are connected, a rotatable discharge-hopper, and a flexible tube connected with one of the discharge-passages thereof.

30. In a centrifugal bean-picking machine, the combination of a plurality of rolls, swinging frames, means for imparting motion to said separating-rolls, a feed-tube through which the beans are fed to said rolls, a rotatable pan to which said tubes are connected, a rotatable discharge-hopper, a flexible tube connected with one of the discharge-passages thereof, and a double discharge-hopper.

31. In a centrifugal bean-picking machine, the combination of a plurality of rolls, swinging frames, means for imparting motion to said separating-rolls, a feed-tube through which the beans are fed to said rolls, a rotatable pan to which said tubes are connected, a rotatable discharge-hopper, a flexible tube connected with one of the discharge-passages thereof, and a double discharge-hopper, the spout of one passing through the body of the other.

In testimony whereof I affix my signature in presence of two witnesses.

GEORGE F. CRIPPEN.

Witnesses:
OTTO F. BARTHEL,
LEWIS E. FLANDERS.